(12) United States Patent
Lindinger

(10) Patent No.: US 10,231,543 B2
(45) Date of Patent: Mar. 19, 2019

(54) COVERING DEVICE FOR A SURFACE SIDE OF A WALL ELEMENT

(71) Applicant: Grass GmbH, Hoechst (AT)

(72) Inventor: Gerlinde Lindinger, Wals (AT)

(73) Assignee: Grass GmbH, Hoechst (AT)

( * ) Notice: Subject to any disclaimer, the term of this patent is extended or adjusted under 35 U.S.C. 154(b) by 0 days.

(21) Appl. No.: 14/942,052

(22) Filed: Nov. 16, 2015

(65) Prior Publication Data

US 2016/0150882 A1    Jun. 2, 2016

(30) Foreign Application Priority Data

Nov. 27, 2014    (DE) .................... 20 2014 105 722 U

(51) Int. Cl.
| | | |
|---|---|---|
| *A47B 88/00* | (2017.01) | |
| *A47B 96/00* | (2006.01) | |
| *A47B 95/00* | (2006.01) | |
| *A47B 97/00* | (2006.01) | |
| *F16B 12/26* | (2006.01) | |
| *A47B 88/40* | (2017.01) | |
| *A47B 88/90* | (2017.01) | |

(52) U.S. Cl.
CPC .............. *A47B 96/00* (2013.01); *A47B 88/40* (2017.01); *A47B 95/00* (2013.01); *A47B 97/00* (2013.01); *F16B 12/26* (2013.01); *A47B 88/941* (2017.01); *A47B 2210/08* (2013.01); *A47B 2210/092* (2013.01); *A47B 2220/0052* (2013.01)

(58) Field of Classification Search
CPC .......... A47B 2210/08; A47B 2210/092; A47B 2210/0052; A47B 96/00; A47B 88/04

USPC ............ 312/348.1, 348.4, 265.5, 265.6
See application file for complete search history.

(56) References Cited

U.S. PATENT DOCUMENTS

| | | | | |
|---|---|---|---|---|
| 2,562,290 A | * | 7/1951 | Backus | ................ A47B 88/941 312/330.1 |
| 3,589,788 A | * | 6/1971 | Kaiden | .................. A47B 95/00 312/204 |
| 3,620,404 A | * | 11/1971 | Grasso | .................... E04F 19/08 174/503 |

(Continued)

FOREIGN PATENT DOCUMENTS

| | | |
|---|---|---|
| DE | 37 13 282 A1 | 12/1987 |
| EP | 1 632 151 A1 | 3/2006 |

(Continued)

OTHER PUBLICATIONS

German Search Report (Application No. 20 2014 105 722.6) dated Jul. 16, 2015.

(Continued)

*Primary Examiner* — Daniel J Troy
*Assistant Examiner* — Timothy M Ayres
(74) *Attorney, Agent, or Firm* — Burr & Brown, PLLC

(57) ABSTRACT

A covering device is proposed for a surface side of a wall element, more particularly a side rail of a drawer, with which an aperture in the surface side of the wall element can be covered wherein the covering device has attachment means with which the covering device can be attached to the aperture. According to the invention the attachment means comprise several detent elements which are different from one another wherein the different detent elements are adapted for engagement on different wall thicknesses.

8 Claims, 1 Drawing Sheet

(56) References Cited

U.S. PATENT DOCUMENTS

| | | | | |
|---|---|---|---|---|
| 3,979,796 | A * | 9/1976 | MacDonald | A47B 95/00 24/336 |
| 4,761,319 | A | 8/1988 | Kraus et al. | |
| 4,890,418 | A * | 1/1990 | Sachs | E04F 19/08 49/380 |
| 5,223,673 | A * | 6/1993 | Mason | H02G 3/16 174/53 |
| 6,158,802 | A * | 12/2000 | Akagi | B60Q 1/0076 200/296 |
| 6,975,504 | B2 * | 12/2005 | Robinson | G01R 11/04 174/17 CT |
| 7,178,886 | B2 * | 2/2007 | Hightower | A47B 96/00 312/204 |
| 7,183,487 | B1 * | 2/2007 | O'Young | H02G 3/14 174/66 |
| 7,338,140 | B1 * | 3/2008 | Huang | G06F 1/181 312/223.2 |
| 7,429,700 | B2 * | 9/2008 | Kanamaru | H01R 13/506 174/135 |
| 7,903,412 | B2 * | 3/2011 | Spivey | H05K 7/20445 165/185 |
| 8,193,446 | B1 * | 6/2012 | Taylor | H02G 3/123 174/50 |
| 8,480,186 | B2 * | 7/2013 | Wang | H05K 5/0013 312/223.1 |
| 2006/0049730 | A1 | 3/2006 | Sutterlutti | |

FOREIGN PATENT DOCUMENTS

| | | |
|---|---|---|
| FR | 2 982 595 A1 | 5/2013 |
| GB | 2 190 832 A1 | 12/1987 |
| WO | 2010/045782 A1 | 4/2010 |
| WO | 2010/051901 A2 | 5/2010 |

OTHER PUBLICATIONS

Extended European Search Report (Application No. 15190932.2) dated Apr. 26, 2016.

* cited by examiner

COVERING DEVICE FOR A SURFACE SIDE OF A WALL ELEMENT

This application claims the benefit under 35 USC § 119(a)-(d) of German Application No. 20 2014 105 722.6 filed Nov. 27, 2014, the entirety of which is incorporated herein by reference.

FIELD OF THE INVENTION

The invention relates to a covering device for a surface side of a wall element as well as to a furniture item.

BACKGROUND OF THE INVENTION

In the field of furniture construction profile elements, more particularly, hollow profile parts are used as wall elements for making slide-in boxes, drawers and similar movably mounted furniture parts. Hollow profiles of this kind offer the advantage that assembly elements and adjusting devices can be housed out of sight in a cavity. An end side which is formed by cutting the profile element to a desired length thereby has a profile opening corresponding, in particular, to the cross-section of the cavity in which an assembly element can be housed at the end side in order to connect the corresponding end side to a further wall element preferably at right angles. It is known, more particularly for adjustable assembly elements, to form a comparatively small aperture in one surface side on a corresponding wall element so that an adjusting element, such as by way of example an eccentric or a screw, is accessible from outside through the aperture at least with a tool—for example a screw driver.

In order however to prevent dirt from entering through one such aperture into a cavity of a wall element during use covering devices are known in various different forms for closing a corresponding opening. Because the covering device is to be as optically inconspicuous as possible and is to be attached comparatively securely in the event of cleaning it is usual to match the covering device comparatively closely to the wall element and its aperture.

SUMMARY OF THE INVENTION

The object of the present invention is to provide a covering device which can be used in many cases.

The present invention is based on a covering device for a surface side of a wall element, more particularly a side rail of a drawer, with which an aperture in the surface side of the wall element can be covered. The covering device has here attachment means with which the covering device can be attached on the aperture.

The core of the present invention consists in the fact that the attachment means comprise several detent elements which are different from one another wherein two different detent elements are adapted to different wall thicknesses. The covering device can thereby be attached advantageously to several different wall elements which have different material thicknesses on the surface sides with an aperture for mounting and adjusting connecting components. A wall element can furthermore where necessary have different material thicknesses on for example opposite sides wherein at least one of the different detent elements can engage behind a surface side snap-fitted on the edge of the aperture. Additional manufacturing expense and thus costs connected therewith are consequently avoided because the covering device according to the invention can replace several different variations of a cover by one embodiment.

The aperture is preferably formed in the surface side of the wall element which is provided for visible arrangement on the furniture item, and not on the end side where the wall element is connected to another drawer part. The aperture can be provided for example for engagement of or access to an assembly element which is arranged inside the wall element. The assembly element can here be intended for example for fixing or for adjusting a second wall element, e.g. a front panel and e.g. a rear wall.

The covering element preferably has a plate-like basic body. An aperture with a comparatively low structural height can thereby be completely closed off, more particularly, over an entire opening area.

A preferred design of the present invention consists in the fact that one of the detent elements is connected resiliently pliable to the basic body parallel to a first covering surface of the basic body which is provided for an arrangement facing the wall element. The basic body can hereby cover the surface side completely flush for example. Holding forces are then guided perpendicularly against the edge of the aperture in order to reliably fix the covering device.

It is furthermore preferred that each of the detent elements has a block-shaped projection with a contact bearing surface pointing outwards relative to the next edge section, and with a staggered surface opposite the first covering surface and adjoining the contact bearing surface at an angle. The block-shaped projection can advantageously engage as a detent catch at the edge of the opening with detent action behind the surface side of the wall element and with the action of a ram press the contact bearing surface against an edge of the aperture in order to secure the covering device against the aperture with friction-locking engagement. Two different holding functions are thereby formed in space-saving manner on the detent element.

The contact bearing surface of one of the detent elements is preferably arranged at right angles to a face section of the covering surface which is provided for flat abutment against the surface side of the wall element. An interspace can thereby be avoided between the covering basic body and the surface side through the springback of the covering device.

It is furthermore preferred that an off-set edge, at which the contact bearing surface adjoins the off-set surface, of a first of the detent elements has a distance from the first covering surface which is different from a corresponding distance of an off-set edge of a second of the detent elements. The distance between one of the off-set surfaces and the first covering surface here defines a maximum material thickness which can be engaged by the corresponding detent element. The first covering surface which is one of the two large main faces of the plate-like basic body, is therefore the inner covering surface which can bear in particular against the outside face of the wall element. The second covering surface is accordingly the visible outward facing main surface in the assembled state on the surface side of the wall element.

The block-shaped projection forms a quasi bolt which is provided for engagement of a wall section of the wall element at the edge of the aperture when the material size or thickness at the wall section permits this. The off-set edge is preferably capable of being arranged between at least one of the two off-set faces and the covering surface. In the case of a comparatively thin wall the two detent elements can engage behind a wall section wherein when necessary only one of the off-set faces bears against a rear side of a wall section. In the case of a slightly greater wall thickness the contact bearing face of the detent element which has the smaller distance from the off-set edge, bears against the edge of the aperture whilst the projection of the detent element with the greater distance can still engage behind the wall section at the edge of the aperture. If the material thickness of the wall element exceeds both distances then none of the detent elements can engage behind the wall section at the aperture edge and both detent elements adjoin the aperture edge with the contact bearing face of the respective projection.

At least two of the detent elements with differently spaced off-set faces are preferably arranged on a common outline section of the first covering surface whereby an interengaging fastening can be ensured by at least one of the detent elements.

The contact bearing faces of at least two of the detent elements with differentially spaced off-set faces can thereby be aligned in agreement in the same direction. The contact bearing faces of the at least two detent elements with differently spaced off-set faces preferably lie in a common plane which is perpendicular to the covering surface. The perpendicularly aligned plane can be considered as a tangential plane.

The first covering surface preferably has a rectangular outline. It is particularly preferred here if several of the detent elements are arranged on a common straight outline section of the covering surface wherein at least two of the detent elements differ in that their off-set edges and different distances from the covering surface are arranged on the same outline section. Where applicable at least one of the detent elements on the straight outline section can engage behind the wall element at the edge of an aperture on the outline section.

A preferred design of the invention consists in that the projection of one of the detent elements is attached on a free-standing swing section of an elastically flexible bar wherein the latter is fixedly connected at two opposite ends to the basic body by support columns projecting up from the covering surface. An advantageous alignment of the detent element, more particularly of the projection, can thereby be made comparatively stable. The bar can be tensioned freely just from one support to the other. In order to achieve a relatively high contact pressure force with a comparatively large detent path of the projection the bar can have a curved shape.

BRIEF DESCRIPTION OF THE DRAWINGS

The invention will now be explained in further detail using an exemplary embodiment and with reference to the drawings. The embodiment is shown diagrammatically in the drawings and is not to scale.

DETAILED DESCRIPTION OF THE INVENTION

Figure 1:
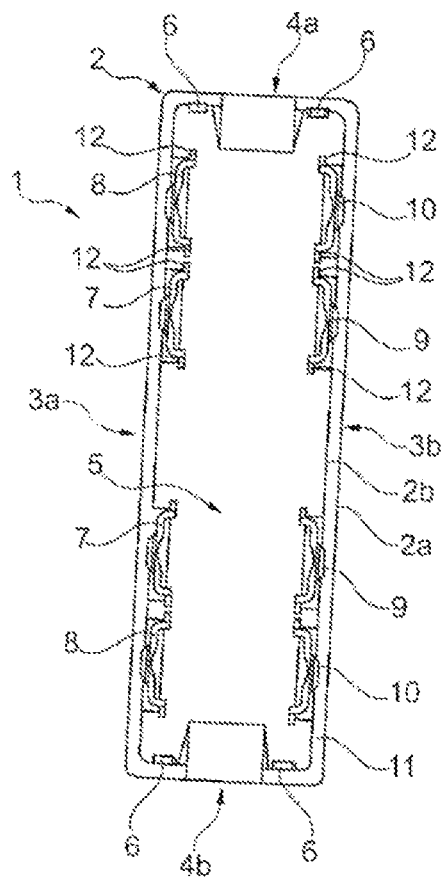
FIG. 1 shows a section of a first covering surface of a covering device according to the invention.

FIG. 1 shows an exemplary embodiment of a covering device 1 according to the present invention with a plate-like basic body 2. The plate-like basic body 2 has a rectangular outline with two long sides 3a and 3b as well as two short sides 4a and 4b. FIG. 1 shows the first covering surface 5 of the basic body which when attached to an aperture (not shown) on a surface side of a wall element (not shown) faces the wall element and its aperture. Several attachment means are formed on the first inner covering surface 5 of the basic body. By way of example lugs 6 protrude perpendicularly from the covering surface and are provided for bearing elastically tensioned against for example an edge of an aperture (not shown). The lugs 6 can furthermore serve to guide movement for example during insertion of the covering device. The attachment means furthermore comprise several detent elements 7, 8, 9 and 10 which are arranged on the long sides 3a and 3b.

The plate-like basic body 2 has two layers 2a and 2b, for example, of the same thickness. The inner layer 2b has a smaller outline which is arranged preferably concentric with the larger outline of the outer layer 2a. The first, i.e. inner covering surface 5 thereby has a stepped off-set edge 11 which surrounds the inner layer 2b for example at a constant width.

The outline of the inner layer 2b is preferably adapted to an outline of an aperture (not shown) in a surface side of a wall element (not shown) in such a way that the inner layer 2b can be inserted into the aperture. Play of the inner layer 2b inside the aperture—at least parallel to the short side edges 4a and 4b—is preferably clearly less than a spring path of one of the detent elements 7-10. The play of the inner layer 2b is similarly preferably smaller than a width with which the edge 11 protrudes over the inner layer 2b in order to prevent an uncovered area occurring at the aperture.

Different detent elements 7-10 are arranged spread out along the sides 3a and 3b. For example, several different detent elements 7 and 8 are arranged on the side 3a symmetrically relative to a center point of the side 3a, wherein the detent elements 8 are placed further out relative to the detent elements 7. Several different detent elements 9 and 10 are similarly formed and arranged on the side 3b. The detent elements 7 and 9 as well as the detent elements 8 and 10 can then be constructed identical in pairs.

Figure 2:
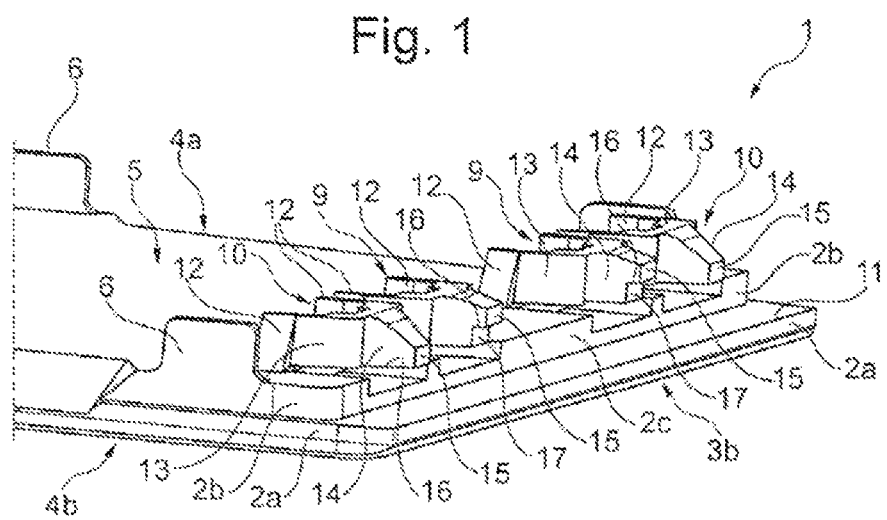
FIG. 2 shows a section of a perspective view of the covering device.

FIG. 2 shows the covering device 1 in section with the side 3b on which the detent elements 9 and 10 are provided. Each of the detent elements 9, 10 has two support columns 12 which protrude at a distance from one another perpendicularly from the inner layer 2b of the basic body 2. A bar 13 swung approximately in a semi-circular shape projects outwardly aligned on the two support columns 12 and connects the two support columns 12 of the detent element 9 or 10 to one another. In the centre of the bar 13, which preferably projects the furthest outwards, a block-shaped projection 14 is formed on the outside of the bar 13. The block-shaped projection 14 projects beyond a peripheral side face 2c of the inner layer 2b whereby a stop face 15 of the block-shaped projection 14 is arranged freely protruding above the edge 11. The stop face 15 can bear for example flat against an edge of the aperture with a contact pressure force which can be produced by deformation of the bar 13 in the inserted position in an aperture (not shown).

Underneath the stop face 15 a further surface 16 is formed on the projections 14 and is arranged at a for example right angle relative to the stop face 15. The surface 16 is preferably arranged at a distance opposite the edge 11 whereby a section of a surface side which surrounds an aperture (not shown) can be pushed into an interspace between the edge 11 and the projection 14.

The surface 16 on the detent element 10 is a side face of the block-shaped projection 14 which is placed at a distance corresponding to a height of the side face 2c above the edge 11.

In the case of the detent elements 9 an off-set stagger is formed on the block-shaped projection 14 wherein the stop face 15 is recessed by the off-set face 16 from a second stop face 17 which is off-set inwards, for example, towards a plane of the surface 2c opposite the stop face 15. The off-set face 16 on the detent elements 9 thus lies at a greater distance from the edge 11 than the off-set face 16 of the detent elements 10. The projection 14 of one of the detent elements 9 can thereby engage behind a surface side (not shown) with greater material thickness at the edge of an aperture (not shown) than the projection 14 of a detent element 10.

LIST OF REFERENCE NUMERALS

1 Covering device
2 Basic body
2a Layer (outer)
2b Layer (inner)
2c Surface
3a Side edge
3b Side edge
4a Side edge
4b Side edge
5 Covering surface
6 Lug
7 Detent element
8 Detent element
9 Detent element
10 Detent element
11 Edge
12 Support column
13 Bar
14 Projection
15 Stop face
16 Off-set face
17 Stop face

The invention claimed is:

1. A covering device for a surface side of a wall element configured to cover an aperture in the surface side of the wall element, wherein the covering device has a substantially planar basic body and an attachment mechanism with which the covering device can be attached to the aperture, wherein the basic body has an inner layer and an outer layer, the inner layer has a smaller footprint than a footprint of the outer layer, the inner layer is arranged concentrically with respect to the footprint of the outer layer, wherein the attachment mechanism comprises a plurality of detent elements which are different from one another, wherein the different detent elements are adapted to engage on different wall thicknesses, wherein each of the plurality of detent elements has a substantially block-shaped projecting portion having at least one stop face and an off-set face having a surface dimension opposing a first covering surface and adjoining the at least one stop face at a right angle, wherein at least one of the detent elements includes a first stop face that is spaced apart from an inner surface of the outer layer and which is arranged substantially perpendicular to the first covering surface of the basic body, the first stop face being configured to contact the wall element and configured to receive a pressure defined by the contact with the wall element, and a second stop face adjacent to the first stop face that is inwardly offset from the first stop face by a distance corresponding to the surface dimension of the off-set face and which is parallel to the first stop face, wherein the projection of at least one detent element of the plurality of detent elements is attached to a free-standing swing section of an elastically deformable bar, the elastically deformable bar being fixedly connected at two opposite ends to the basic body each by a support column projecting up from the first covering surface and wherein the first covering surface is one of two main faces of the basic body, and wherein the first covering surface is configured to bear against an outside face of the surface side of the wall element.

2. The covering device according to Claim 1, wherein an off-set edge, at which the first stop face adjoins the off-set face, of a first detent element of the plurality of detent elements is spaced a distance from the first covering surface that is different from a corresponding distance of an off-set edge of a second detent element of the plurality of detent elements.

3. The covering device according to claim 2, wherein at least two detent elements of the plurality of detent elements with differently spaced off-set faces are arranged on a common outline section surface of the first covering surface.

4. The covering device according to Claim 3, wherein the first stop face of at least two detent elements of the plurality of detent elements with differently spaced off-set faces are aligned in agreement in the same direction.

5. The covering device according to Claim 4, wherein the first stop face of at least two detent elements of the plurality of detent elements with differently spaced off-set faces lie in a common plane perpendicular to the first covering surface.

6. The covering device according to Claim 2, wherein several detent elements of the plurality of detent elements are arranged on a common straight outline section of the covering surface, wherein at least two of the detent elements of the several detent elements have off-set edges arranged on the same outline section at different distances from the first covering surface.

7. The covering device according to claim 1, wherein the first covering surface has a rectangular outline.

8. The covering device according to claim 1, wherein the bar has a curved shape.

* * * * *